(12) United States Patent
Weisser et al.

(10) Patent No.: US 9,267,859 B2
(45) Date of Patent: Feb. 23, 2016

(54) MECHANICAL FLUID SENSOR

(71) Applicant: Marquardt Mechatronik GmbH, Rietheim-Weilheim (DE)

(72) Inventors: Dietmar Weisser, Tuttlingen (DE); Markus Scheiter, Wurmlingen (DE)

(73) Assignee: Marquardt Mechatronik GmbH, Rietheim-Weilheim (DE)

( * ) Notice: Subject to any disclaimer, the term of this patent is extended or adjusted under 35 U.S.C. 154(b) by 139 days.

(21) Appl. No.: 13/904,223

(22) Filed: May 29, 2013

(65) Prior Publication Data
US 2013/0291646 A1 Nov. 7, 2013

Related U.S. Application Data

(63) Continuation of application No. PCT/EP2011/005975, filed on Nov. 29, 2011.

(30) Foreign Application Priority Data

Nov. 29, 2010 (DE) .......................... 10 2010 053 455

(51) Int. Cl.
| | |
|---|---|
| *G01L 7/00* | (2006.01) |
| *G01L 19/00* | (2006.01) |
| *G01L 9/00* | (2006.01) |
| *G01L 19/14* | (2006.01) |

(Continued)

(52) U.S. Cl.
CPC ............ *G01L 19/0007* (2013.01); *G01D 5/145* (2013.01); *G01D 11/16* (2013.01); *G01L 9/007* (2013.01); *G01L 19/003* (2013.01); *G01L 19/143* (2013.01)

(58) Field of Classification Search
CPC ............ G01L 19/0007; G01L 19/0084; G01L 19/147
USPC ........................................................... 73/756
See application file for complete search history.

(56) References Cited

U.S. PATENT DOCUMENTS 4,487,074 A * 12/1984 Herden .......................... 73/708
5,140,733 A   8/1992 Shimada et al.
(Continued)

FOREIGN PATENT DOCUMENTS

DE       24 42 155 A1    3/1976
DE    689 08 697 T2    12/1993
(Continued)

OTHER PUBLICATIONS

German Search Report dated Aug. 4, 2011.
International Search Report and Written Opinion dated Jun. 27, 2012.

*Primary Examiner* — Lisa Caputo
*Assistant Examiner* — Nathaniel T Woodward
(74) *Attorney, Agent, or Firm* — Burr & Brown, PLLC

(57) ABSTRACT

The invention relates to a measuring apparatus for measuring a measurement variable of a fluid, particularly a sensor, such as a pressure sensor or a displacement sensor. The measuring apparatus comprises a housing, a diaphragm arranged in and/or on the housing, and a resilient element formed in the manner of a leaf spring for restoring the diaphragm. A signal transmitter is operatively connected to the diaphragm and/or the resilient element, and a signal receiver cooperates with the signal transmitter. The resilient element is fastened on the housing at the edge of the resilient element, more specifically in particular only at parts of the edge.

14 Claims, 4 Drawing Sheets

(51) Int. Cl.
  *G01D 5/14*   (2006.01)
  *G01D 11/16*  (2006.01)

(56) References Cited

U.S. PATENT DOCUMENTS

| | | | |
|---|---|---|---|
| 8,631,710 B2 * | 1/2014 | Weisser et al. | ................ 73/728 |
| 2005/0000291 A1 | 1/2005 | Shirai et al. | |

FOREIGN PATENT DOCUMENTS

| | | | |
|---|---|---|---|
| DE | 10 2009 050 554 A1 | | 4/2010 |
| EP | 0 913 677 A1 | | 5/1999 |
| EP | 1 621 860 A1 | | 2/2006 |
| GB | 451178 | * | 7/1936 |
| GB | 1519803 A | * | 8/1978 |
| GB | 1 519 803 A | | 8/1998 |

* cited by examiner

MECHANICAL FLUID SENSOR

CROSS REFERENCE TO RELATED APPLICATIONS

This application is a continuation of International Application No. PCT/EP2011/005975 filed Nov. 29, 2011, which designated the United States, and claims the benefit under 35 USC §119(a)-(d) of German Application No. 10 2010 053 455.2 filed Nov. 29, 2010, the entireties of which are incorporated herein by reference.

FIELD OF THE INVENTION

The invention relates to an apparatus for measuring a measurement variable of a fluid, particularly a sensor, such as pressure sensor, a displacement sensor or the like.

BACKGROUND OF THE INVENTION

The measuring apparatus may be a sensor, such as a pressure sensor, a displacement sensor, or the like. Such measuring apparatuses are used in particular to measure a measurement variable of a fluid, for example, to measure the water level in washing machines, dishwashers, wet and/or dry vacuum cleaners or in other water-guiding parts of domestic appliances. In particular, these measuring apparatuses are pressure sensors for low pressures, for example, specifically less than 3,500 Pa (Pascal).

Measuring apparatuses of this type comprising a housing and a diaphragm arranged in and/or on the housing are known. A resilient element for restoring the diaphragm is located in the housing. A signal transmitter is operatively connected to the diaphragm and/or to the resilient element. A signal receiver cooperates with the signal transmitter in order to generate the measuring signal. It has been proven that external influences on the measuring apparatus disturb the resilient element, which in turn may lead to a falsification of the measuring signal.

SUMMARY OF THE INVENTION

The object of the present invention is to develop the measuring apparatus in such a way that the quality of the measuring signal is improved. In particular, a stable mechanical measuring system is to be created, which functions independently of external influences where possible.

In the case of the measuring apparatus according to the present invention, the resilient element is held on the housing and/or is fastened on the housing at the edge of the resilient element, more specifically at parts of the edge. The suspension or the fastening of the resilient element is thus decoupled from the actual spring element, such that the spring element can swing freely. Due to the decoupling, disturbing external influences cannot act on the spring element, thus advantageously preventing falsifications of the measuring signal. In other words, the present invention provides a mechanical decoupling of the outer contours of the measuring apparatus from the actual mechanical measuring system by means of a sprung suspension.

In one embodiment, to reduce the installation height of the measuring apparatus, it is proposed for the resilient element to be formed in the manner of a disk-shaped leaf spring. The leaf spring expediently has a substantially circular shape, which corresponds substantially to the shape of the diaphragm. A particularly high restoring force can be achieved with the resilient element since the leaf spring has a spring element running in a spiraled manner from the center to the edge region of the leaf spring. A compact embodiment with high spring force is thus ensured.

In a simple embodiment of the present invention, at least one lug can be found on the edge region of the resilient element in order to hold and/or to fasten the resilient element. Three lugs are preferably attached to the resilient element and are arranged uniformly over the periphery at the edge of the resilient element, whereby a stable support of the resilient element on the housing is ensured. For a particularly stable fastening, the lug can be fastened on the housing by adhesive bonding. In one embodiment, the lug may comprise an indentation in order to ensure sufficient receipt of adhesive by means of a corresponding flow into the indentation in the event of adhesive bonding.

In another embodiment, the lug expediently comprises two mutually opposed indentations, which ensures a particularly durable adhesive bond. The resilient element can be produced cost-effectively from metal as a punched and/or bent part, wherein the lug can be easily stamped onto the resilient element and bent expediently as necessary. The resilient element including the lug can be produced in a simple manner as a punched and bent part in a corresponding tool.

In a simple and cost-effective embodiment, the signal transmitter consists of a magnet. The signal receiver consists of a position sensor, which detects the magnetic field generated by the magnet. The position sensor may be a Hall sensor. It is proposed to arrange the signal transmitter on the resilient element, more specifically in particular in the center thereof. In order to prevent a displacement between the magnet and the spring, the signal transmitter is expediently adhesively bonded to the resilient element.

In order to largely protect the sensitive parts of the measuring apparatus against harmful influences, the diaphragm and the resilient element and also the signal transmitter and the signal receiver can be arranged in the interior of the housing. The housing then comprises a connection piece for feeding the fluid that is to be measured to the diaphragm.

The advantages achieved by the present invention lie in particular in the fact that disturbing external influences are not transferred to the resilient element, or more specifically are not transferred to the spring element. Falsifications of the measuring signal by external influences are therefore prevented and the quality of the measuring signal is increased.

BRIEF DESCRIPTION OF THE DRAWINGS

An exemplary embodiment of the invention with different developments and embodiments is illustrated in the drawings and will be described in greater detail hereinafter.

DETAILED DESCRIPTION OF THE INVENTION

Figure 1:
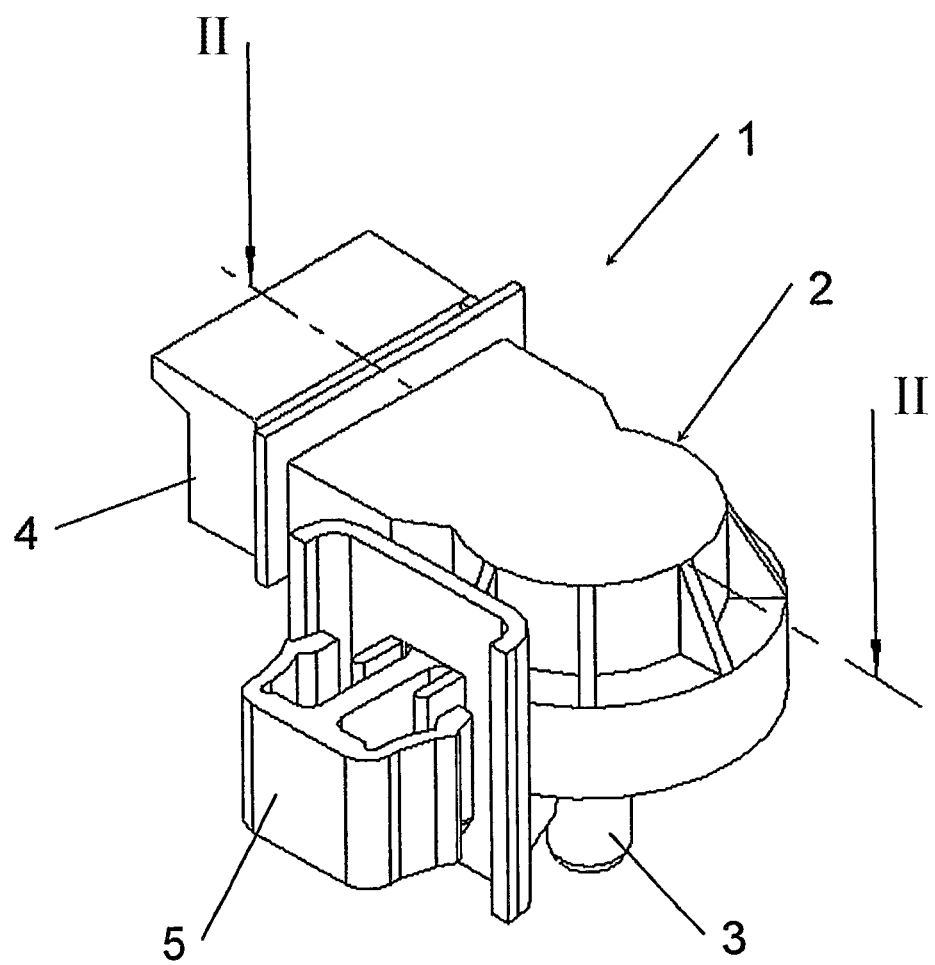
FIG. 1 shows a perspective view of a pressure sensor.

In FIG. 1, a pressure sensor 1 can be seen that is used as a measuring apparatus for measuring a measurement variable of a fluid, more specifically in the present case for measuring the pressure of a liquid in a domestic appliance. The pressure sensor 1 has a housing 2, on which a connection piece 3 is arranged for feeding the liquid that is to be measured, and also a plug connection 4 for connection of the electrical feed lines. The pressure sensor 1 can be assembled in the domestic appliance by means of a detent mechanism 5 located on the housing 2. The housing 2 lastly comprises a base 6 and a cover 7 according to FIG. 2.

Figure 2:
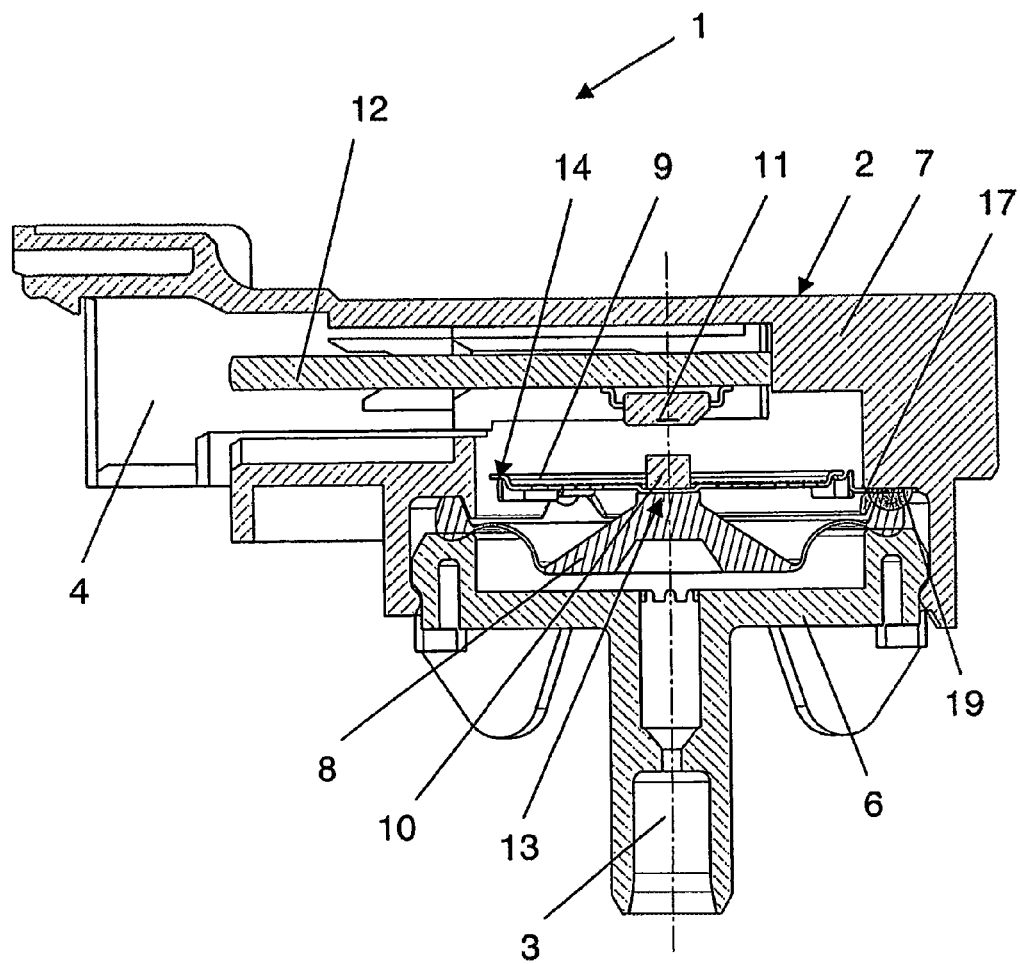
FIG. 2 shows a sectional view through the pressure sensor along line II-II in FIG. 1.

As can also be deduced from FIG. 2, a diaphragm 8 is arranged in and/or on the housing 2 and the liquid acts on the diaphragm via the connection piece 3. The diaphragm 8 is deflected in accordance with the pressure prevailing in the liquid. A resilient element 9 located in the housing 2 acts as a spring on the diaphragm 8 in order to restore the diaphragm 8. A signal transmitter 10 is operatively connected to the diaphragm 8 and/or the resilient element 9, whereby the signal transmitter 10 is displaced in accordance with the deflection of the diaphragm 8. A signal receiver 11 in turn cooperates with the signal transmitter 10 and generates a signal corresponding to the displacement of the signal transmitter 10. The signal transmitter 10 and also the signal receiver 11 are arranged in the interior of the housing 2.

Figure 5:
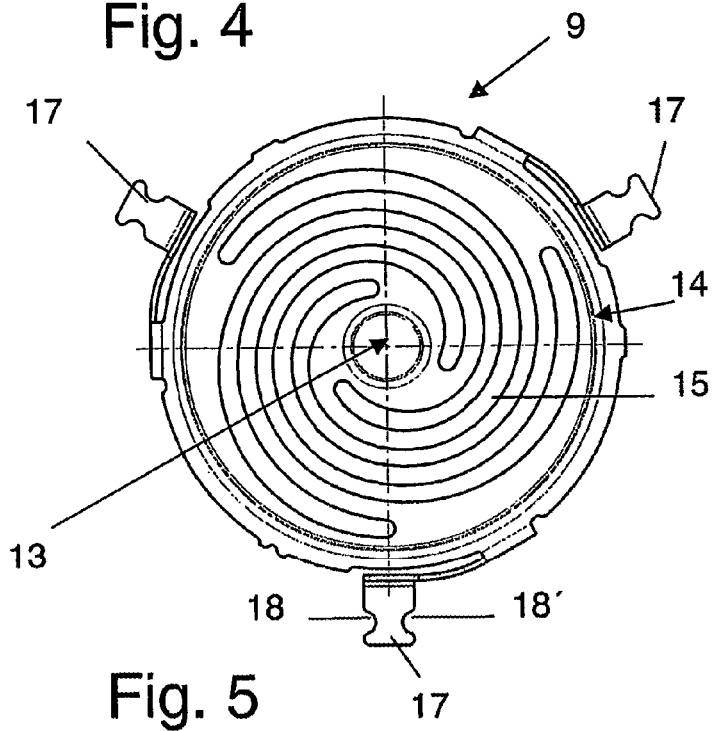
FIG. 5 shows a plan view of the resilient element from FIG. 4.

The signal transmitter 10 consists of a magnet, more specifically of a permanent magnet. The magnet (signal transmitter 10) is fastened on the resilient element 9, and more specifically is adhesively bonded to the resilient element 9 in the center 13 thereof (see FIG. 5). The signal receiver 11 consists of a position sensor, which is arranged in the housing 2 on a printed circuit board 12 on the side of the signal transmitter 10 opposite the diaphragm 8. For cooperation with the magnet (signal transmitter 10), a Hall sensor in particular is proposed as a position sensor (signal receiver 11), which detects the magnetic field generated by the magnet (signal transmitter 10) in accordance with the displacement thereof. In the present case, the position sensor (signal receiver 11) is formed as an integrated circuit, which contains the evaluation electronics, such that the corresponding signal for displacement of the signal transmitter 10 is available in an accordingly converted manner at the plug connection 4 as a measuring signal for the pressure prevailing in the liquid.

Figure 4:
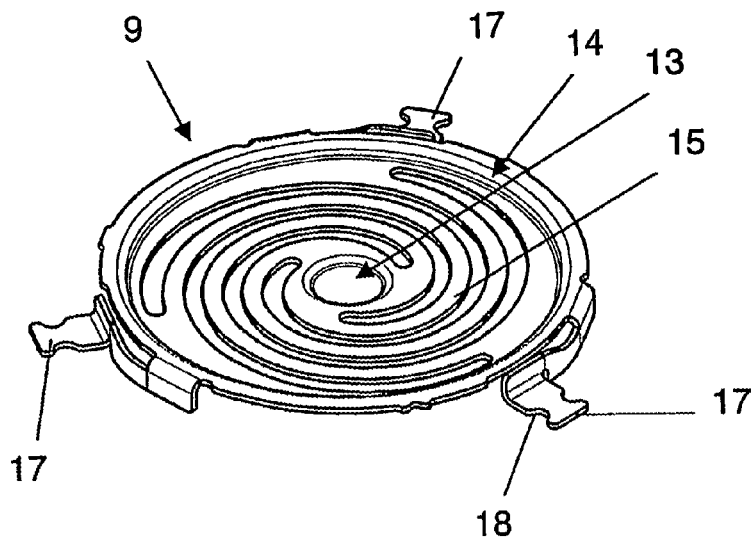
FIG. 4 shows a perspective illustration of the resilient element of the pressure sensor as an individual part.
Figure 6:
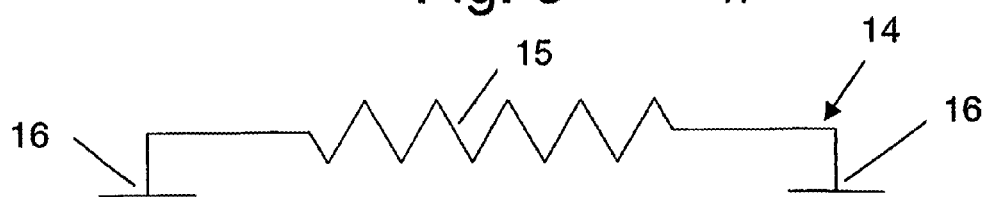
FIG. 6 shows a schematic diagram of the operating principle of the resilient element.

The substantially circular diaphragm 8 consists of an elastomer, for example of silicone. The spring (resilient element 9) consists of metal, for example of a spring steel. The spring (resilient element 9), which is likewise substantially circular, is designed in the manner of a disk-shaped leaf spring, as can be seen with reference to FIG. 4, and comprises a spring element 15 running in a spiraled manner from the center 13 to the edge region 14 of the leaf spring (resilient element 9). As can also be seen in FIG. 2, the resilient element 9 is held and/or fastened on the housing 2 at the edge 14 of the resilient element, more specifically at parts of the edge 14. The suspension 16 of the resilient element 9 effected as a result of the mounting and/or fastening of the parts of the edge 14 thus decouples the resilient element 9 from the actual spring element 15, as can be seen in principle in FIG. 6, such that the spring element 15 can swing freely. External disturbing influences therefore cannot act negatively on the spring element 15.

Figure 3:
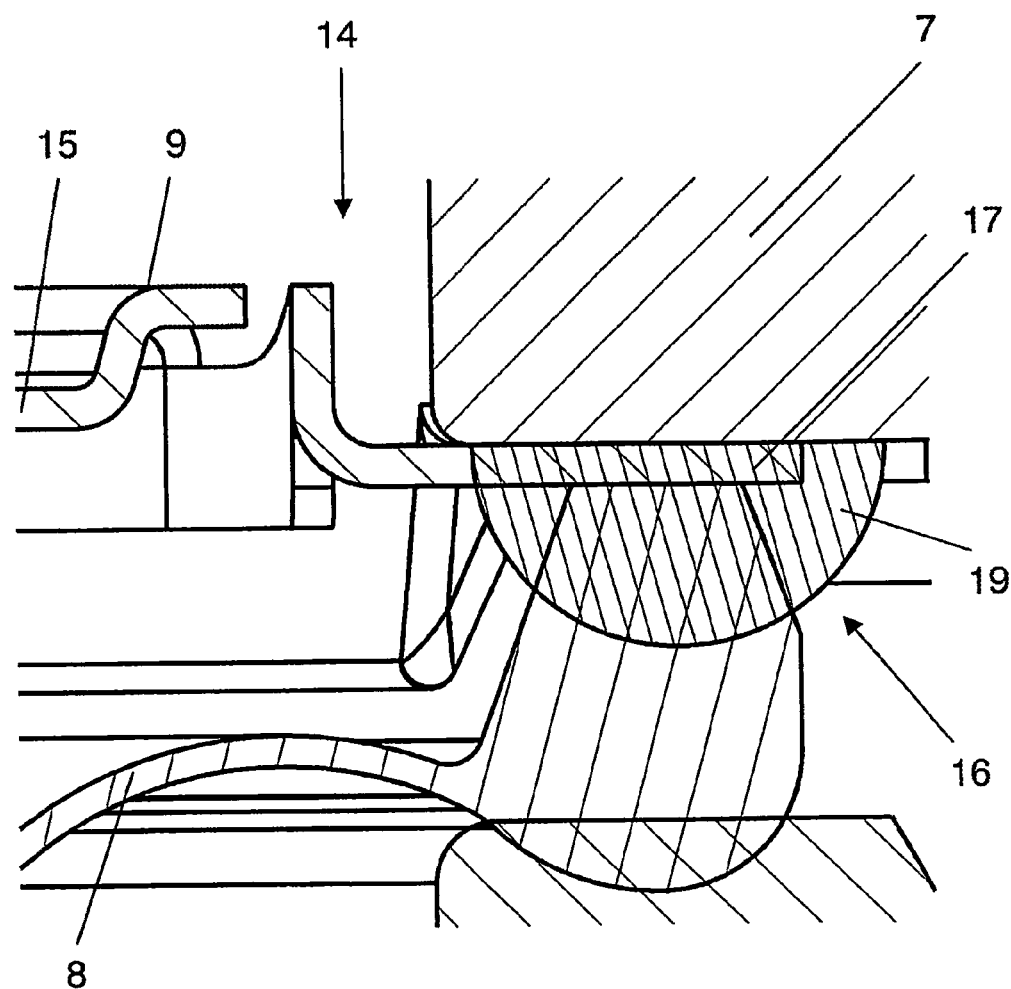
FIG. 3 shows an enlarged detail from FIG. 2 in the edge region of the resilient element of the pressure sensor.

The suspension 16 is formed as a lug 17, which can be fastened on the housing 2 by means of adhesive bonding. In accordance with FIG. 2, the lug 17 is fastened on the cover 7 by means of an adhesive droplet 19. The suspension 16 of the resilient element 9 in the housing 2 by means of the adhesive droplet 19 on the lug 17 can be seen in greater detail in FIG. 3. As can also be deduced from FIG. 5, at least one lug 17 for fastening the resilient element 9 on the housing 2 is located at the edge region 14 of the resilient element 9. For the purposes of symmetry and also effective fastening of suspension 16, three such lugs 17 are located on the edge region 14 of the resilient element 9 in the present case, however, and are each distanced from one another by 120°. As already mentioned, the resilient element 9 consists of metal. It is thus proposed for the resilient element 9 to be produced as a punched part. During production, the lug 17 can be stamped and accordingly bent, whereby the resilient element 9 can be produced as a punched and bent part. The lug 17 comprises an indentation 18 (visible in FIG. 5), which is used to receive adhesive since the adhesive may flow into the indentation 18 in the event of adhesive bonding of the lug 17 to the housing 2. For the purposes of effective fastening, it is proposed for the lug 17 to comprise two mutually opposed indentations 18, 18' for the adhesive droplet 19.

The present invention is not limited to the described and illustrated exemplary embodiments. Rather, it comprises all developments routine in the art within the scope of the invention defined by the claims. Such a measuring apparatus may thus also be used as another sensor, such as a fill level sensor, displacement sensor, or the like, more specifically not just for domestic appliances, but also in other applications, for example in lab technology and in chemical engineering.

LIST OF REFERENCE SIGNS

1: pressure sensor
2: housing
3: connection piece
4: plug connection
5: detent mechanism
6: base (of housing)
7: cover (of housing)
8: diaphragm
9: resilient element/spring/leaf spring
10: signal transmitter/magnet
11: signal receiver/position sensor
12: printed circuit board
13: center (of resilient element)
14: edge region (of resilient element)/edge
15: spiraled spring element
16: suspension
17: lug (on spring)
18, 18': indentation (on lug)
19: adhesive droplet

The invention claimed is:

1. A measuring apparatus for measuring a measurement variable of a fluid comprising: a housing, a diaphragm arranged at least one of in the housing and on the housing, a resilient element for restoring the diaphragm, a signal transmitter operatively connected to at least one of the diaphragm and the resilient element, and a signal receiver cooperating with the signal transmitter, wherein the resilient element is at least one of held on the housing and fastened on the housing only at parts of an edge region of said resilient element.

2. The measuring apparatus as claimed in claim 1, wherein the diaphragm, the resilient element, the signal transmitter and the signal receiver are arranged in an interior of the housing, and wherein the housing further comprises a connection piece for feeding the fluid to the diaphragm.

3. The measuring apparatus as claimed in claim 1, wherein the measuring apparatus is one of a pressure sensor and a displacement sensor.

4. The measuring apparatus as claimed in claim 1, wherein the resilient element is formed as a disk-shaped leaf spring, and the leaf spring has a circular shape.

5. The measuring apparatus as claimed in claim 4, wherein the resilient element is a spring element running in a spiraled manner from a center to the edge region of the leaf spring.

6. The measuring apparatus as claimed in claim 1, wherein the signal transmitter consists of a magnet, and the signal receiver consists of a position sensor detecting the magnetic field generated by the magnet.

7. The measuring apparatus as claimed in claim 6, wherein the position sensor is a Hall sensor.

8. The measuring apparatus as claimed in claim 1, wherein the signal transmitter is arranged on the resilient element and the signal transmitter is adhesively bonded to the resilient element.

9. The measuring apparatus as claimed in claim 8, wherein the signal transmitter is arranged in the center of the resilient element.

10. The measuring apparatus as claimed in claim 1, further comprising at least one lug on the edge region of the resilient element to fasten the resilient element on the housing.

11. The measuring apparatus as claimed in claim 10, wherein the resilient element is produced from metal as a punched and bent part, on which the lug is stamped.

12. The measuring apparatus as claimed in claim 10, wherein the lug is fastened on the housing by means of adhesive bonding.

13. The measuring apparatus as claimed in claim 10, wherein the lug comprises an indentation for receiving adhesive in the event of adhesive bonding.

14. The measuring apparatus as claimed in claim 13, wherein the lug comprising two mutually opposed indentations for receiving adhesive in the event of adhesive bonding.

* * * * *